United States Patent Office 3,100,195
Patented Aug. 6, 1963

3,100,195
BULK POLYMERIZATION OF STYRENE IN THE PRESENCE OF A SATURATED FATTY ACID AND A MINERAL OIL
Jack Zomlefer, Leominster, Mass., assignor to Solar Chemical Corporation, Leominster, Mass., a corporation of Massachusetts
No Drawing. Filed Nov. 25, 1959, Ser. No. 855,264
5 Claims. (Cl. 260—23)

This invention relates to bulk polymerization of styrene. In particular it relates to bulk polymerization of styrene so as to provide an improved polymer capable of being used in molds having thin and large surfaced sections.

The generally previously described methods for mass or bulk polymerization of styrene comprise heating the liquid styrene monomer with a catalyst in suitable apparatus so as to control the temperature of the charge. Attempts to control the properties of the finished polymer are done either by attempting to control the degree of conversion of the monomer to polymer or by adding compounding agents to the finished polymer. Neither approach is generally suitable where the object is to increase flowability in the mold and still retain the desired properties of polystyrene and its copolymers. Thus plasticizers do not accomplish this.

One object of this invention is to provide a method for making homopolymers and copolymers of styrene which have the desired increased flowability in a mold but none of the deleterious properties generally associated with a plasticizer.

Other objects and advantages of this invention will appear from the specification and claims which follow.

This invention comprises essentially utilizing a formulation comprising for each 100 parts by weight of the monomer, 0.1 to 4.0 parts of a saturated fatty acid having at least 12 carbon atoms, approximately 3 to 10 parts of a mineral oil having a viscosity of 40 to 250 centipoises, and the usual amount of catalyst such as may be normally used in bulk polymerization of styrene. The most useful range of fatty acid content is 0.1 to 1.0 parts per 100 parts of styrene. The most useful range of mineral oil content is approximately 3.5 to 7.0 parts per 100 parts of styrene. Where excessive amounts of either fatty acid (over 4 parts/100 styrene) or mineral oil (over 10 parts/100 styrene) are used there is often the possibility that either the resulting polymer will be cloudy or it will be difficult to mold. A combination of a fatty acid range of 0.1 to 1.0 part and a mineral oil range of 3.5 to 7.0 parts per 100 parts of styrene appears to give the best overall properties and ease of molding. In particular a mineral oil having a viscosity of 70 to 80 centipoises at normal room temperature gives a product which is easiest to mold and has the highest clarity.

Among the co-monomers which can be used with styrene are styrene derivatives such as alpha-methyl styrene, halogenated derivatives such as mono and dichloro styrenes, aliphatic esters of methacrylic and acrylic acids, acrylonitrile, and butadiene. The range of co-monomer can be the amount desired generally but it has been found that the increased flowability is most marked where the co-monomer range is 0.1 to 15 parts per 100 parts of styrene monomer.

With respect to the saturated fatty acids which can be used in this invention it has been found that saturated fatty acids between $C_{12}$ and $C_{20}$ seem to give the most satisfactory results as regards the molding quality of the finished product. The following are examples of acids which can be used: capric, undecyclic, lauric, tridecylic, myristic, pentadecylic, palmitic, heptadecanoic, stearic, nondecylic, arachidic.

The catalysts that can be used are as stated before any of the usual catalysts for bulk polymerization of styrene. Typically such catalysts are monomer soluble and include organic peroxides (benzoyl peroxides) and hydroperoxides and azo initiators (e.g. azo-bis-iso butyronitrile) and the like. The quantities used are similar to those previously described in the art.

With respect to time-temperature cycles these are also similar to those previously described in the art. As is well known it is not recommended by the art that a bulk polymerization be carried out at a single high temperature because of the tremendous heat buildup at various stages of the polymerization. It is usually recommended by the art that the temperature be first at a low stage until a syrup is formed, then at an intermediate stage and finally at the high temperature for final conversion. However the details of time and temperature are considered within the skilled of the art.

It has also been found that the clarity and heat resistance of the polymers of this invention can be appreciably increased by incorporating therein minute amounts of oil-soluble blue dyes, particularly of the alizarin type.

As a specific example of this invention 120 parts of styrene monomer are mixed with 0.06 part of benzoyl peroxide, 0.5 part of stearic acid and 5 parts of a white mineral oil having a viscosity of approximately 75 centipoises. The mixture is heated in a suitable container such as a kettle at a temperature of from about 70 to 80° centigrade for a period of about 10 hours or until there is achieved a maximum viscosity of 1000 centipoises. The resultant syrupy material is then heated at 70 to 80° centigrade in an apparatus having means for temperature control such as frames and plates of a filter press equipped with interior concealed channels for steam or water. After heating for 10 to 12 hours at this temperature of 70 to 80° centigrade the temperature is then raised to 120 to 160° centigrade and held there for a period of about 7 hours. Upon cooling the cakes of polymer that are formed are removed and then converted or formed as desired into molding powders, extrusions or the like. When this polymer is placed in an injection molding machine it is found to be exceptionally easy and rapid for use with molds having large areas and thin sections as for example molds for picnic ware, tumblers, containers, wall tile and the like.

If in the above example there is also added to the monomer-catalyst-acid-oil mixture 0.000082 part of an oil-soluble blue alizarin type dye (e.g. Alizarin Irisol-N), the resultant products have the same molding qualities but the clarity and light resistance of the finished molded product are exceptionally improved. The range of addition of such dyes is from .000080 to 0.000084 part per 120 parts of monomer (.000067 to .000070 per 100).

In a similar manner co-monomers such as alpha-methyl styrene, acrylonitrile, methyl methacrylate, ethyl methacrylate, butadiene etc. are incorporated in proportions ranging from 0.1 to 15% of the monomer to provide copolymers having improved flowability.

I claim:
1. A process for the bulk polymerization of monomers consisting of 85 to 100% of styrene and 0 to 15% of an ethylenic monomer co-polymerizable with styrene, comprising heating a mixture of 100 parts of said monomers, catalyst, approximately 0.1 to 4.0 parts of a saturated fatty acid having 12 to 20 carbon atoms and approximately 3.0 to 10 parts of a mineral oil of 40 to 250 centipoises in viscosity.

2. A process for the bulk polymerization of styrene comprising heating a mixture of 100 parts of styrene monomer, catalyst, approximately 0.1 to 4 parts of a saturated fatty acid having 12 to 20 carbon atoms and 3.5 to 7 parts of a mineral oil of 40 to 250 centipoises in viscosity.

3. A process for bulk polymerization of styrene comprising heating a mixture of 100 parts of styrene monomer, catalyst, approximately 0.1 to 4 parts of a saturated fatty acid having 12 to 20 carbon atoms, 3 to 7 parts of a mineral oil of 40 to 250 centipoises in viscosity and 0.000067 to 0.000070 part of alizarin blue dye.

4. A process for the bulk polymerization of styrene comprising heating a mixture of 100 parts of styrene monomer, catalyst, approximately 0.1 to 1.0 part of stearic acid, 3.5 to 7 parts of a white mineral oil having a viscosity of approximately 70 to 80 centipoises and 0.000067 to 0.000070 part of an oil soluble alizarin blue dye.

5. The composition prepared by the bulk polymerization with heat of a mixture of 100 parts of styrene monomer, catalyst, approximately 0.1 to 4.0 parts of a saturated fatty acid having 12 to 20 carbon atoms and 3.5 to 7.0 parts of a mineral oil of 40 to 250 centipoises in viscosity.

References Cited in the file of this patent
UNITED STATES PATENTS

| | | |
|---|---|---|
| 2,568,765 | Roon et al. | Sept. 25, 1951 |
| 2,619,478 | Wehr et al. | Nov. 25, 1952 |
| 2,675,362 | Shusman | Apr. 13, 1954 |

OTHER REFERENCES

"The Chemistry of Synthetic Resins," by Ellis, vols. I and II, Reinhold Publ. Co. (New York), 1935, page 234.